United States Patent
Heinrich et al.

(10) Patent No.: US 6,402,394 B1
(45) Date of Patent: Jun. 11, 2002

(54) OPTICAL TRANSMITTING/RECEIVING MODULE

(75) Inventors: Jochen Heinrich, Blaubeuren; Eberhard Zeeb; Kurt Pressmar, both of Ulm; Manfred Rode, Senden, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/530,980

(22) PCT Filed: Oct. 30, 1998

(86) PCT No.: PCT/EP98/06883

§ 371 (c)(1),
(2), (4) Date: Jul. 17, 2000

(87) PCT Pub. No.: WO99/24855

PCT Pub. Date: May 20, 1999

(30) Foreign Application Priority Data

Nov. 6, 1997 (DE) .......................... 197 48 989

(51) Int. Cl.[7] .............................. G02B 6/36; G02B 6/12; G02B 6/30
(52) U.S. Cl. ........................ 385/89; 385/88; 385/49; 385/14
(58) Field of Search ............................. 385/14, 49, 88, 385/89, 90, 91, 92, 93, 94, 15, 16, 18; 359/152, 154, 159, 188, 193, 195

(56) References Cited

U.S. PATENT DOCUMENTS

| 5,201,018 | A | | 4/1993 | Coden et al. .................. 385/88 |
| 5,347,605 | A | * | 9/1994 | Isaksson ....................... 385/92 |
| 5,487,124 | A | * | 1/1996 | Bowen et al. ................. 385/93 |
| 6,019,523 | A | * | 2/2000 | Honmou ....................... 385/94 |
| 6,264,377 | B1 | * | 7/2001 | Mitsuda et al. ............... 385/88 |

FOREIGN PATENT DOCUMENTS

| DE | 42 30 952 | | 3/1994 |
| DE | 44 02 166 | | 11/1994 |
| EP | 0 803 757 | | 10/1997 |
| GB | 2 312 527 A | * | 10/1997 |
| WO | 90/02349 | | 3/1990 |
| WO | 97/36201 | | 10/1997 |

* cited by examiner

*Primary Examiner*—Cassandra Spyrou
*Assistant Examiner*—Euncha Cherry
(74) *Attorney, Agent, or Firm*—Kenyon & Kenyon

(57) ABSTRACT

An optical transmitting/receiving module including a support plate with passive reflectors, one or several optical fibers, a transmitter and a receiver. The support plate has a specular coating and therefore has an opaque surface. The surface of the support plate is structured by means of embossment or stamping. A surface emitting laser diode with a vertical resonator (VCSEL) may be particularly suitable as an optical transmitter in conjunction with a photodiode which serves as the receiver. The transmitting/receiving fibers may include multimode optical fibers.

10 Claims, 3 Drawing Sheets

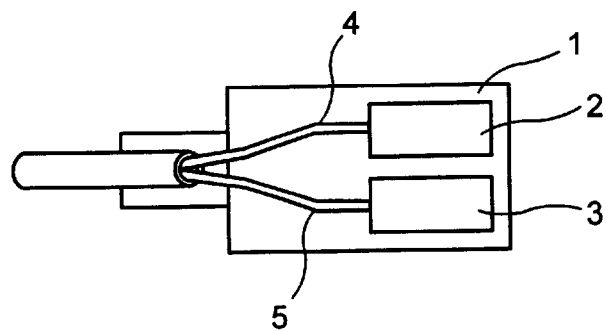
F I G. 1a
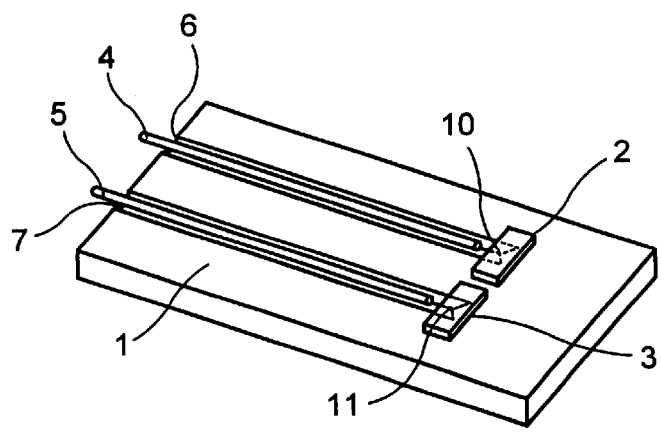
F I G. 1b
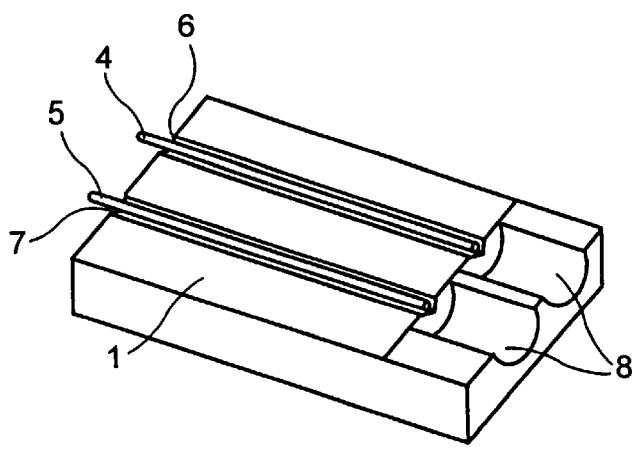
F I G. 1c

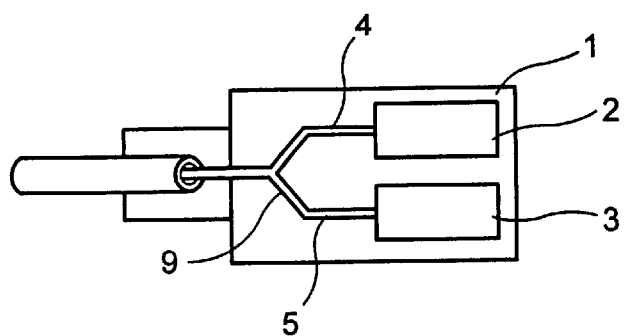
F I G. 2a
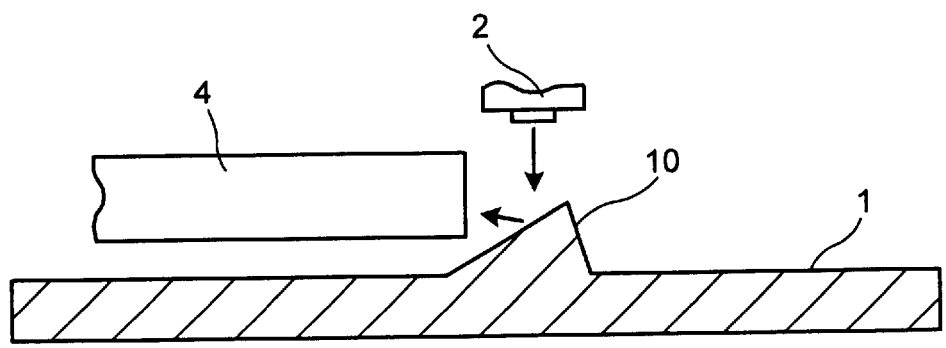
F I G. 2b
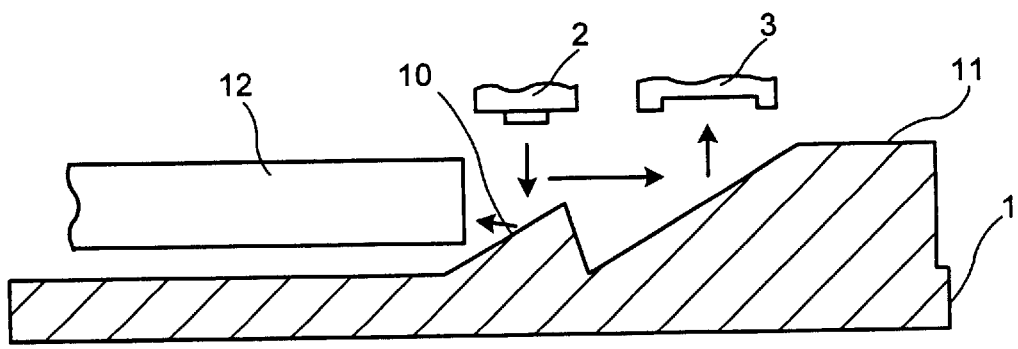
F I G. 3a

OPTICAL TRANSMITTING/RECEIVING MODULE

This application is a 371 of PCT/EP98/06883 filed Oct. 30, 1998 which claims priority from Germany application No. 19748989.3 filed Nov. 6, 1997.

FIELD OF THE INVENTION

The present invention relates to an optical transmitting/receiving module.

BACKGROUND OF THE INVENTION

For reasons of interference immunity as well as to minimize weight and volume, optical signal transmission is becoming increasingly important in comparison to signal transmission over electrically conductive connections. In this context, a significant proportion is constituted by optical waveguides such as glass fibers or plastic optical fiber cables. However, in optical data buses, in contrast to electrical data buses, supplemental optical transmitting and receiving modules are required as electrical/optical or optical/electrical converters, since signal processing in the stations still takes place electrically. As a result, additional costs are created, and volume and weight are increased. Depending on the bus topology and bus protocol, in line-conducted optical systems for the transmitting and receiving paths, both two light waveguides (so-called two-wire arrangement) as well as one light waveguides (so-called one-wire arrangement) are used. The advantage of a one-wire arrangement is that a minimal number of lines and plug-in connections are used in the physical bus layer, although in the optical transmitting/receiving module, coupling elements such as Y-couplers also have to be integrated, which cause additional transmission losses.

From German Patent Document No. 33 15 861 A1, a fiber-optic coupler is described for connecting a light waveguide to a transmitting/receiving terminal. A support module for a transmitting and a receiving element contains a support body made of optically transparent material. The end segment of a light waveguide is inserted into a V-shaped groove on the support body. The groove terminates in a semi-transparent inclined plane, which functions as a transmitting/receiving deflector. Light arriving in the light waveguide is directed by the semi-transparent mirror surface through the material of the support body onto a receiving element. Light emitted by a transmitting element is deflected at the mirror surface into the light waveguide.

Since the support body at the deflecting mirror surface must be semi-transparent, the selection of materials is limited to transparent ones. In this context, the total coupling efficiency as the product of the coupling and decoupling efficiency, is less than 25%.

From the document, W. Hunziker, et al.: IEFE Photonics Technology Letters, Vol. 7, No. 11, November 1995, a method is described for housing a semiconductor laser array in silicon in connection with optical waveguides.

In addition, International Patent Document WO 97/36201 A describes a transmitting module, in which light from a transmitter is deflected into a transmission fiber with the assistance of a reflectively coated, opaque support plate, and light is directed from a receiving fiber to a receiver also with the assistance of a support plate.

In this context, a significant disadvantage lies in the use of silicon as the support material, which must be structured/shaped in relatively expensive process steps. Furthermore, the procedure described in the document is limited, in the creation of grooves, to the use of mono-crystalline (111) silicon and therefore represents a comparatively cumbersome and thus expensive mode of operation, restricting the range of variation in the selection of materials.

Therefore, an object of the present invention is to indicate an optical transmitting/receiving module that is distinguished by an optimized arrangement for increasing the efficiency in the signal processing and by a compact design, and that has a simple shape, making it therefore cost-effective and allowing for a wide range of variation in the selection of materials.

The present invention provides an optical transmitting/receiving module, in particular for a one-wire arrangement, comprising a reflectively coated, opaque support plate, optical transmitting/receiving fiber(s), a transmitter as laser diode, and a receiver. A groove, introduced in the reflectively coated surface for accommodating the transmitting/receiving fiber, is arranged on the support plate, and a coupling mirror, as an extension thereof, is stamped on the support plate. The coupling mirror only partially blocks the fiber end, its inclination being determined as a function of the choice of mode, at a defined angle for the maximum coupling of the light. A decoupling mirror, as a further extension, is stamped on the support plate, the decoupling mirror completely blocking the fiber end. The optical transmitter and receiver may be mounted directly over the mirrors (FIG. 3a).

One embodiment of the optical transmitting/receiving module is composed of a support plate, a transmitter, a receiver, and optical fiber(s), and can be used for a two-wire arrangement or a one-wire arrangement having a supplemental Y-coupling element or for a one-wire arrangement without the supplemental Y-coupling element. The basic element of this arrangement is a metallic or plastic support plate, which has a reflective coating and is therefore opaque, and deflecting mirrors having adjustable inclination, area, and surface quality for deflecting the light to be coupled or decoupled, as well as recesses for accommodating the transmitters or receivers are stamped into grooves that are created using stamping technology, for example V- or U-shaped or rectangular grooves, for accommodating multimode optical fibers. For the opaque reflective coating on the support plate, a gold coating, for example, can be used.

As the optical transmitter, it may be particularly suitable to use a surface-emitting laser diode having a vertical resonator (VCSEL; vertical cavity surface emitting laser) in connection with a photo diode as the receiver. The transmitting/receiving fibers are composed of cylindrical multimodule light waveguides made of glass or polymers, having a core diameter of at least 50 µm.

In the case of a two-wire arrangement or a one-wire arrangement having a supplemental Y-coupling element, on the one hand, two separated grooves, introduced using stamping technology for accommodating the transmitting and receiving optical fibers, and two separated coupling and decoupling mirrors are stamped on the support plate, and the optical transmitter and receiver are disposed directly over the mirrors in pre-stamped recesses.

In the case of a two-wire arrangement or a one-wire arrangement having a supplemental Y-coupling element, on the other hand, two separated grooves, introduced using stamping technology in the reflectively coated surface for accommodating the transmitting and receiving optical fibers, are stamped in the support plate, and a housed optical transmitter and a receiver are disposed in pre-stamped recesses in direct extension of the fibers.

Furthermore, in the case of a one-wire arrangement without supplemental coupling elements, a groove introduced using stamping technology in the reflectively coated surface for accommodating the transmitting/receiving fibers, a coupling mirror as an extension thereof, only partially blocking the fiber end, and a decoupling mirror as a further extension completely blocking the fiber end are stamped on the support plate, and the optical transmitter and receiver are disposed directly over the mirrors in pre-stamped recesses.

Alternatively, the optical transmitter is arranged in a pre-stamped recess directly over the mirrors and, in a further extension of the fiber, the optical receiver is disposed directly behind the coupling mirror in pre-stamped recesses.

The stamping technology used can also be applied if, in place of VCSEL and photo diode chips, housed transmitters and receivers are used. Also possible is a combination of housed and non-housed components.

One advantage of the present invention, and particularly efficient, is the fact that by using stamping technology, in which the desired structure is stamped into the surface of the support plate using a stamp die, a cost-effective, compact design is achieved.

A further advantage of the present invention lies in the fact that, for example, coupling elements having minimal installation losses are also integrated in the stamped support plate of the module, so that compact, low-loss transmitting/receiving modules are available for data buses in a one-wire arrangement. As a result of an arrangement in which the components fiber, transmitter, and receiver, lie one behind the other, supplemental Y-coupling elements can be dispensed with, as result of the fact that the coupling mirror blocks only a certain part of the light that emerges from the transmitting/receiving fiber. The unblocked component is coupled onto the detector. As result of the proposed stamping technology, it is possible to optimize the height and angle of the coupling mirror with regard to the maximum coupling of the light of a preselected transmitter into a preselected fiber. As a result of optimization, overall efficiencies significantly greater than 25% can be achieved.

BRIEF DESCRIPTION OF THE DRAWINGS

In the following, the present invention is explained in greater detail on the basis of exemplary embodiments with reference to the drawings in which:

FIG. 1a shows a transmitting/receiving module in a two-wire arrangement;

FIG. 1b shows a detailed view of the transmitting/receiving module having deflector mirrors;

FIG. 1c shows a detailed view of the transmitting/receiving module without deflector mirrors;

FIG. 2a shows a transmitting/receiving module in a one-wire arrangement having a Y-coupler;

FIG. 2b shows a cross-section of the transmitting module having a deflector mirror;

FIG. 3a shows a detailed view of the transmitting/receiving module in a one-wire arrangement without coupler having two deflector mirrors;

DETAILED DESCRIPTION

Figure 3B:
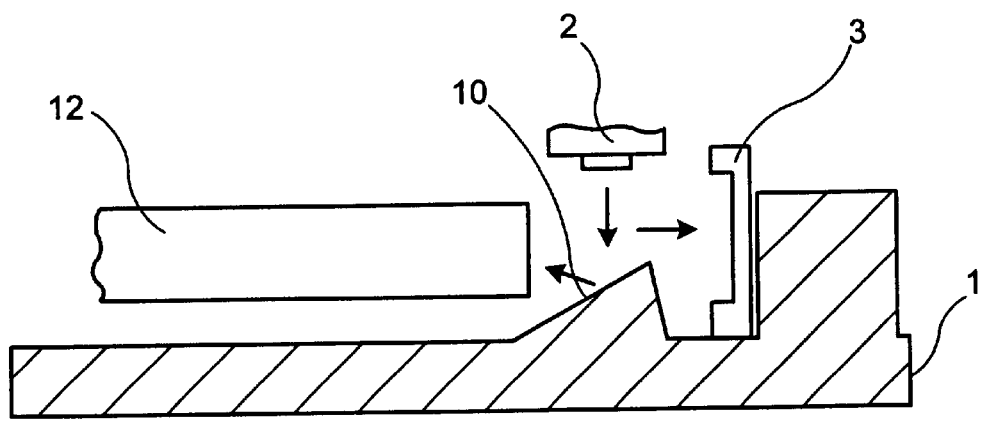
FIG. 3b shows a cross-section of the transmitting/receiving module in a one-wire arrangement without coupler having a deflector mirror for the transmitter.

The transmitting/receiving module depicted schematically in FIG. 1a is composed of a support plate 1, an optical transmitter 2, an optical receiver 3, as well as a transmitting fiber 4 and a receiving fiber 5, both of which discharge into a guide sleeve (a two-wire arrangement).

Using stamping technology, grooves 6 and 7, for example, having a V shape, are introduced into support plate 1 (FIG. 1b) for accommodating transmitting and receiving fibers 4 and 5. Receptacles for optical transmitter 2 and receiver 3 and the inclined planes of coupling and decoupling mirrors 10, 11 are formed, also using stamping technology, at the end of the V-shaped longitudinal grooves. In this context, transmitter 2 and receiver 3 are inserted into the receptacles using flip-chip technology and, in each case, are located directly over the coupling or decoupling mirrors 10, 11. Support plate 1 made of metal and/or plastic is covered by an opaque, reflective metal coating, which can be made, for example, of gold or, for reasons of adhesiveness to materials having varying thermal expansions, of a multilayer structure such as copper/gold. In this context, the metal coating can be applied either before the stamping procedure or subsequently, and also, optionally, only in the area of V-shaped grooves 6, 7 and in coupling and decoupling mirror 10, 11.

The fibers 4, 5, deflector mirrors 10, 11, transmitter 2, and receiver 3, are arranged so as to be positioned precisely in the beam path, so that the light transmitted in transmitter 2 is reflected at opaque decoupling mirror 10 and, depending on the mode selected at a defined angle, is directed into transmitting fiber 4; or the light directed into receiving fiber 5 is reflected by opaque coupling mirror 11 and is detected in receiver 3, positioned in the beam path.

The deflector mirrors can also be dispensed with if, for example, transmitter 2 and receiver 3 are used in TO housings, which are inserted into receptacles 8, provided for this purpose, in a linear continuation of the fiber axes (FIG. 1c).

The transmitting/receiving module schematically depicted in FIG. 2a is also composed of a support plate 1, an optical transmitter 2, an optical receiver 3, as well as a transmitting fiber 4 and a receiving fiber 5, which are joined, however, by a Y-coupler 9 on support plate 1, so that in the further course, only one fiber discharges into the guide sleeve (a one-wire arrangement).

In both described arrangements, one-wire and two-wire, transmitting mirror 10 has at least a height that terminates in the upper side of fiber 4, in order to transmit, at an inclination of the mirror surface of 45°, especially a light beam directed to the transmitting fiber along the fiber axis.

Figure 3C:
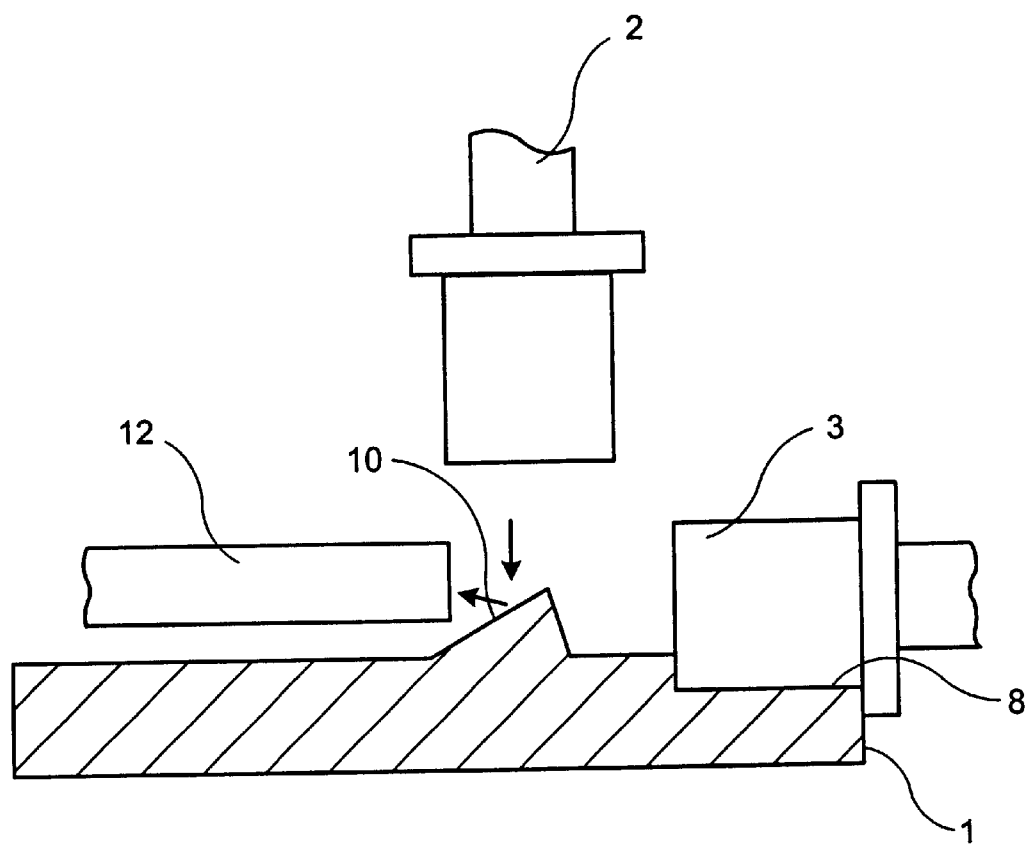
FIG. 3c shows a cross-section of the transmitting/receiving module in a one-wire arrangement without coupler having a deflector mirror for the transmitter in a housed version.

As is depicted in FIG. 2b for the transmitting unit, for light beams directed outside the fiber axis, the mirror height and inclination are variably selected as a function of the angle of incidence in a range as prescribed by the beam path. This mode of operation forms the basis of an arrangement of fiber, transmitter, and receiver, one behind the other, in a plane perpendicular to the support plate and running along the fiber axis. The arrangement also contains only a combined transmitting/receiving fiber, it being possible to dispense with a supplemental Y-coupling element. Several embodiments are depicted in FIG. 3. The cross-section in FIG. 3a depicts decoupling mirror 10, arranged beneath transmitter 2, the decoupling mirror blocking only a certain component of the light that strikes decoupling mirror 11 from transmitting/receiving fiber 12, in order to be registered in detector 3. At as planar as possible an inclination of the decoupling mirror, a significant increase in the intensity of the signal to be evaluated can be achieved, as a result, in the detector. A further increase can be expected from the arrangement depicted in FIG. 3b, in which a decoupling mirror can be entirely dispensed with, due to the fact that detector 3 is disposed directly in the beam path of the signal emerging from the transmitting/receiving fiber and therefore certain losses in intensity in the deflection are avoided. In the same manner, housed components can also be integrated in the arrangement (FIG. 3c). Receptacle 8 for a TO housing can be simply and precisely produced using stamping technology, as in all of the preceding examples.

What is claimed is:

1. An optical transmitting/receiving module comprising:
   at least one optical transmitting/receiving fiber;
   a support plate having a reflectively coated opaque surface and defining a groove for accommodating the transmitting/receiving fiber;
   a coupling mirror stamped on the support plate at a region of an end of the groove and partially blocking an end of the fiber at a predefined angle for coupling of a light beam, the predefined angle being determined as a function a mode for maximum coupling of the light beam;
   a decoupling mirror stamped on the support plate at a region of the end of the groove and completely blocking the end of the fiber;
   an optical transmitter including a laser diode mounted over the coupling mirror; and
   an optical receiver mounted over the decoupling mirror.

2. The optical transmitting/receiving module as recited in claim 1 wherein the support plate includes metal or plastic.

3. The optical transmitting/receiving module as recited in claim 1 wherein the at least one optical transmitting/receiving fiber is at least partially composed of a cylindrical multimode light waveguide having a core diameter of at least 50 $\mu$m.

4. The optical transmitting/receiving module as recited in claim 3 wherein the waveguide includes at least one of glass or a polymer.

5. The optical transmitting/receiving module as recited in claim 1 wherein at least one of the optical transmitter and optical receiver includes a housing.

6. An optical transmitting/receiving module comprising:
   at least one optical transmitting/receiving fiber;
   a support plate having a reflectively coated opaque surface and defining a groove for accommodating the transmitting/receiving fiber;
   a coupling mirror stamped on the support plate at a region of an end of the groove and partially blocking an end of the fiber at a predefined angle for coupling of a light beam, the predefined angle being determined as a function of a mode for maximum coupling of the light beam;
   an optical transmitter including a laser diode mounted over the coupling mirror; and
   an optical receiver mounted behind the coupling mirror.

7. The optical transmitting/receiving module as recited in claim 6 wherein the support plate includes metal or plastic.

8. The optical transmitting/receiving module as recited in claim 6 wherein the at least one optical transmitting/receiving fiber is at least partially composed of a cylindrical multimode light waveguide having a core diameter of at least 50 $\mu$m.

9. The optical transmitting/receiving module as recited in claim 8 wherein the waveguide includes at least one of glass or a polymer.

10. The optical transmitting/receiving module as recited in claim 6 wherein at least one of the optical transmitter and optical receiver includes a housing.

* * * * *

UNITED STATES PATENT AND TRADEMARK OFFICE
CERTIFICATE OF CORRECTION

PATENT NO.     : 6,402,394 B1
DATED          : June 11, 2002
INVENTOR(S)    : Heinrich et al.

It is certified that error appears in the above-identified patent and that said Letters Patent is hereby corrected as shown below:

<u>Column 2,</u>
Between lines 5 and 6, insert the following heading -- SUMMARY OF THE INVENTION --.

Signed and Sealed this

Eighteenth Day of November, 2003

JAMES E. ROGAN
*Director of the United States Patent and Trademark Office*